United States Patent [19]
Arai et al.

[11] Patent Number: 4,589,665
[45] Date of Patent: May 20, 1986

[54] FLUOROCARBON RESIN SEAL AND METHOD OF MAKING SAME

[75] Inventors: Yoshio Arai, 1400, Kamihongo, Matsudo-shi, Chiba-ken; Kikuei Mukasa, Urawa, both of Japan

[73] Assignee: Yoshio Arai, Matsudo, Japan

[21] Appl. No.: 964,908

[22] Filed: Nov. 30, 1978

Related U.S. Application Data

[62] Division of Ser. No. 866,944, Jan. 4, 1978, Pat. No. 4,190,258.

[51] Int. Cl.⁴ ............................................. F16J 15/32
[52] U.S. Cl. ....................................... 277/1; 277/153; 277/164
[58] Field of Search ............... 277/1, 134, 165, 152, 277/153, 164, 235 R

[56] References Cited

U.S. PATENT DOCUMENTS 3,561,770 2/1971 Corsi .................................. 277/134
3,866,925 2/1975 Maimstrom et al. ............... 277/164
4,111,440 9/1978 Young ................................. 277/1

FOREIGN PATENT DOCUMENTS 1223641 8/1966 Fed. Rep. of Germany ...... 277/164
1461372 11/1966 France ............................... 277/164

Primary Examiner—Robert I. Smith
Attorney, Agent, or Firm—Armstrong, Nikaido, Marmelstein & Kubovcik

[57] ABSTRACT

A sealing element is provided which is formed of a fluorocarbon resin sheet and radially slit into two annular overlapping flaps to receive a garter spring or the like therebetween at a location adjacent to that peripheral portion of the element which is left solid and formed with a sealing edge. Despite the limited elasticity of the seal material per se, the sealing element, finally molded into shape, has an exceedingly high ability to follow the mating surface of a rotating shaft or other member of a mechanical assembly to be sealed. The followability of the sealing element is further improved on account of the slit formation of the element.

4 Claims, 11 Drawing Figures

FLUOROCARBON RESIN SEAL AND METHOD OF MAKING SAME

This is a division of application Ser. No. 866,944 filed Jan. 4, 1978, now U.S. Pat. No. 4,190,258.

BACKGROUND OF THE INVENTION

This invention relates generally to seals and more particularly to radial seals formed of fluorocarbon resin which are usable, for example, as an oil seal, exerting radial sealing pressure to retain liquid or gaseous fluid and/or exclude foreign matter, and methods of making such radial seals.

In general, radial seals such as oil seals are required to meet the following conditions: (1) First, they should exhibit satisfactory resistances to wear, heat and pressure and other physical properties generally required of a sealing device and additionally substantial chemical, corrosion and fungus resistances as well as satisfactory durability. (2) Secondly, they should at all times have a good followability, that is, an ability to closely follow the mating surface of a rotating shaft or other member to be sealed for good elastic sealing contact therewith and be capable of serving the intended sealing function for an extended period of service.

As for seal materials, among others, fluorocarbon resin is known to meet the requirements stated above in (1) and seal units including a sealing element formed of this sort of resin material have previously been in use. For example, a seal unit has been proposed which includes at least one sealing element formed of fluorocarbon resin and including, as illustrated in FIG. 10 of the accompanying drawings, a lip portion r and a flange portion f which is formed integral therewith and clamped by metallic case means m.

Though such seal unit generally satisfies the requirements stated above in (1), its sealing performance has been unsatisfactory in that the lip portion r of its sealing element exhibits only a limited ability to follow the mating surface of a rotating shaft or the like member to be sealed. In a proposal previously made to overcome this difficulty, the lip portion r' of the sealing element formed of fluorocarbon resin is lined over the outside surface thereof with an appropriate elastomeric material e by heat-bonding, as shown in FIG. 11, and an annular, garter spring s is fitted to the elastomeric lining e around the periphery thereof in order to improve the sealing characteristics and particularly the followability of the seal lip portion relative to the mating member to be sealed.

Even with such improved form of seal unit, however, the advantageous characteristics of fluorocarbon resin, of which the sealing element is formed, cannot be fully utilized because of the use of lining e formed of an elastomeric material which is generally inferior to fluorocarbon resin in resistance to chemicals, corrosion and fungi. In addition, the extra labor needed for the heat-bonding of elastomeric material e on the sealing element obviously involves an increase in cost of production and the exposed garter spring, metallic in nature, is liable to loss of durability under the influence of any liquid adhering thereto. On account of these disadvantages, it has been practically impossible even with this form of seal unit to obtain any fully satisfactory results.

SUMMARY OF THE INVENTION

Under these circumstances, the present invention has for its primary object the provision of a new and improved radial seal of the type including a sealing element formed of fluorocarbon resin which is designed to make the most of the advantageous characteristics of the resin material while at the same time compensating for the limited elasticity of the material to improve the followability of the sealing element relative to the mating surface of a shaft or the like member to be sealed and exhibits an extraordinarily high sealing efficiency.

Another object of the present invention is to provide a new method of making a radial seal of the character described which is highly efficient, not involving any variations in shape and size as well as in performance of the final product.

A further object of the present invention is to provide a seal-making method which is applicable to the manufacture of a radial seal of the character described irrespective of whether the seal is intended for use as an inner seal for sealing a shaft or the like member around the outer periphery thereof or as an outer seal for sealing the mating member around the inner periphery thereof.

Yet another object of the present invention is to provide a radial seal of the character described which is formed integrally of fluorocarbon resin and is not only usable as an oil seal in a state fitted with appropriate metallic cases but also usable by itself as a sealing member in various applications.

Another object of the present invention is to provide a seal of the character described which is applicable to a wide variety of mechanical assemblies as an oil seal or as packing means between associated members.

These and other objects, features and advantages of the present invention will become apparent from the following description when taken in conjunction with the accompanying drawings, which illustrate a number of preferred embodiments of the invention.

DESCRIPTION OF THE PREFERRED EMBODIMENTS

Figure 1:
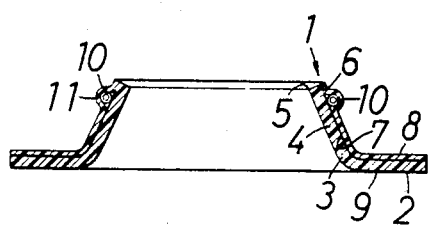
FIG. 1 is a cross-sectional side view of an inner seal embodying the present invention.

Referring to the drawings and first to FIG. 1, which illustrates a typical form of fluorocarbon resin seal embodying the present invention and usable as an inner seal, the body 1 of the seal illustrated is made from a powder of fluorocarbon resin by baking the material and then cutting and molding the baked material into form, as will be described later in detail. As shown, the sealing element or body 1 consists of a radially extending annular flange portion 2 and a frustoconically shaped lip portion 4 which extends from the inner periphery of the flange portion 2 at an angle thereto through the intermediary of a flex section 3 defined between the flange and lip portions 2 and 4. The frustoconical lip portion 4 is formed at its top with a lip edge 5 which extends circumferentially around the inner periphery thereof.

The seal body 1 is cut radially around the entire periphery thereof to form a slit 7 therein which radially extends from the outer peripheral edge of the flange portion 2 to a vicinity of the inner peripheral edge of the lip portion 4 in parallel to the opposite surfaces of the seal body 1 to divide the larger part of the latter into two overlapping sections or flaps more or less different in thickness from each other. Reference numeral 6 indicates the inner peripheral edge portion of lip portion 4 which is left solid; and reference numerals 8 and 9, respectively, indicate an outer seal flap smaller in thickness and an inner seal flap larger in thickness.

As shown, an annular coiled spring or so-called garter spring 10 is fitted in the slit 7 at the innermost edge thereof which is adjacent to the solid edge portion 6 of seal lip 4. The outer, thinner seal section or flap 8 is bulged radially outwardly at a location close to its edge joined integral with the inner flap 9 to define together therewith an annular pocket in which the garter spring 10 is nested.

Figure 2:
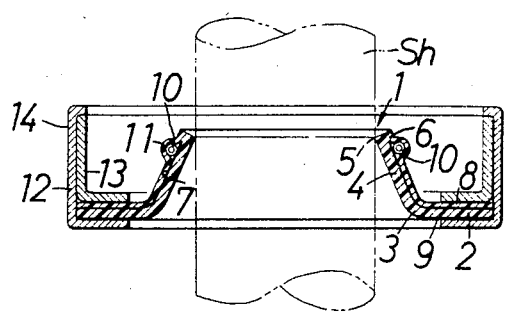
FIG. 2 is a view similar to FIG. 1 of an oil seal embodying the present invention which includes a sealing element fitted with metallic cases.

FIG. 2 illustrates an oil seal unit in which the seal shown in FIG. 1 is incorporated as a single sealing element of the unit. As shown, the sealing element 1 has its flange portion 2 clamped between an outer and an inner metallic case 12 and 13, both of L-shaped cross section. The outer case 12 has an outer peripheral surface 14 defined to fit in a bore formed in the housing member (not shown) of a mechanical assembly to be sealed and serves as an outer case of the seal unit. As shown in chain-dotted lines, a shaft Sh is fitted in the seal unit axially thereof and the lip edge 5 of the sealing element 1 is held in sealing contact with the peripheral surface of the shaft Sh under the resilience of the garter spring 10, which urges the lip edge 5 radially inwardly against the shaft surface to provide an appropriate sealing pressure therebetween. In this manner, the sealing characteristics including the followability of the seal lip portion 4 relative to the peripheral surface of shaft Sh are enhanced to a material extent.

Figure 3:
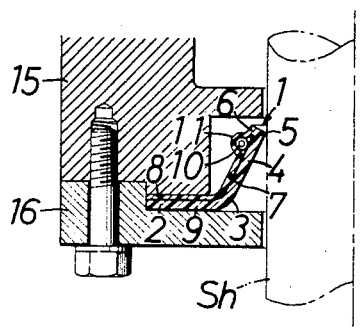
FIG. 3 is a view similar to FIGS. 1 and 2, illustrating one example of use of the inner seal shown in FIG. 1.

FIG. 3 illustrates another example of use of the seal shown in FIG. 1, in which the sealing element 1 is employed by itself to serve as an inner seal for a shaft Sh. Specifically, in this instance, the sealing element 1 is itself secured to a stationary housing member 15 of the mechanical assembly, the flange portion 2 being clamped against the adjacent end surface of the housing member 15 by means of a clamp plate 16.

Incidentally, it is to be noted that the bulged portion 11, substantially semicircular in cross section, of the seal lip 4 additionally serves to reinforce the lip itself and also to enable the stress acting therein to be concentrated at the extremity of the seal lip 4 thereby to increase the radial sealing pressure of the lip edge 5 acting on the periphery of the associated shaft Sh.

Figure 4:
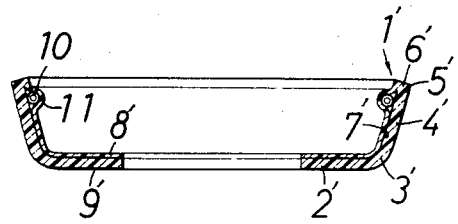
FIG. 4 is a view similar to FIGS. 1 to 3, illustrating an outer seal embodying the present invention.

Illustrated in FIG. 4 is a radial seal which is formed of fluorocarbon resin in accordance with the present invention and usable as an outer seal. In this embodiment, the body 1' of the seal is formed of a radially extending annular flange portion 2' and a frustoconically shaped lip portion 4' which extends from the outer periphery of the flange portion 2' at an angle thereto, defining together with the latter a flex section 3' therebetween. A lip edge 5' is formed on the lip portion 4' around the outer periphery thereof.

As in the case of the embodiment shown in FIG. 1, the seal body 1' has a radial slit 7' cut therein. The slit 7', in this instance, extends radially outwardly from the inner peripheral edge of the flange portion 2' to a vicinity of the outer peripheral edge of the lip portion 4' in parallel to the opposite surfaces of the seal body 1' to divide the larger part of the latter into two overlapping flaps 8' and 9', which are joined at the outer periphery with each other. As clearly seen, the inner flap 8' of the sealing element 1' is smaller in thickness than the outer one 9'.

It will be readily recognized that the outer seal of FIG. 4 functions principally in the same manner as the inner seal shown in FIG. 1 except that, unlike the latter, the former serves to seal the mating member around the inner periphery thereof.

As will be readily appreciated from the foregoing description, with the radial seal of fluorocarbon resin formed in accordance with the present invention, the limited ability of the seal material itself to follow the mating surface of a shaft or other member to be sealed is effectively compensated for by the seal structure including an annular elastic member such as a garter spring embedded in the seal lip portion, which is placed in sealing contact of the mating surface of a shaft or other member to be sealed. Under the radial pressure of the annular elastic member, the seal lip portion can closely follow the mating surface despite the limited elasticity of the seal material itself. The followabiltiy of the seal lip relative to the mating surface is further increased by the seal formation including two overlapping flaps which are joined together around the lip edge portion of the sealing element.

Description will next be made of the process in which the radial seal of the present invention is made, with reference to FIGS. 5 to 9, which illustrate different steps of the method of the present invention as applied to the manufacture of inner seals such as the one shown in FIG. 1.

Figure 5:
FIGS. 5 to 9, inclusive, are side elevational views, in axial cross section, illustrating the process of manufacturing a radial seal according to the method of the present invention.

Referring first to FIG. 5, an annular sheet 17 is prepared by baking a mass of fluorocarbon resin powder and cutting the baked material into shape. The annular sheet 17 is slit, as indicated at 7 in FIG. 6, radially inwardly from the outer peripheral edge thereof to a vicinity of the inner peripheral edge thereof in parallel to the opposite surfaces of the sheet so as to divide the larger part of the sheet into two sections or flaps 8 and 9, which are joined together around the inner periphery thereof and slightly differ from each other in thickness, the upper flap 8 being thinner than the lower one 9.

Figure 7:
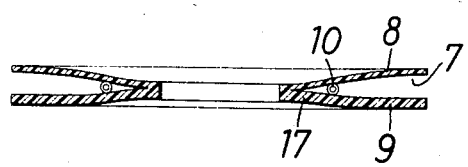
Figure 8:
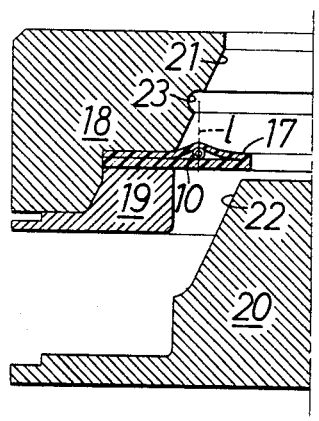
Figure 10:
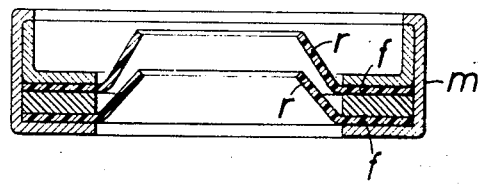
FIG. 10 is an axial cross section of a conventional form of radial seal unit.
Figure 9:
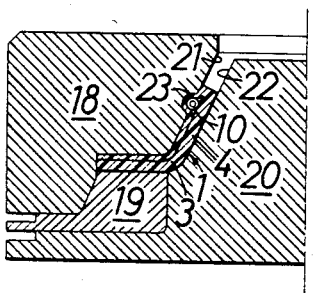
Figure 11:
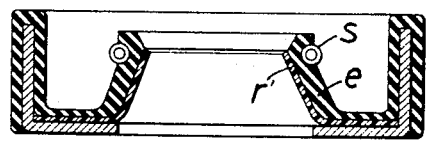
FIG. 11 illustrates another conventional form of radial seal unit.

Subsequently, an annular coiled spring 10 is inserted radially into the slit 7 through the edge opening thereof, as shown in FIG. 7. The annular sheet 17 is then placed in a divided stationary metal mold 18,19, as shown in FIG. 8. The outer half portion of the annular sheet 17 is clamped between the mold sections 18 and 19 so as to hold the remaining, inner half portion of the sheet free in the mold cavity defined in the stationary mold centrally thereof. Subsequently, a movable metal mold 20, arranged vertically opposite to the stationary mold 18,19, is moved toward the latter to place the tapered mold surfaces 21 and 22, respectively formed on the stationary and movable molds 18,19 and 20, in fitting engagement with each other while heating the mold assembly to an appropriate temperature in the range of from approximately 80° C. to 130° C. In this manner, the inner half portion of the annular sheet 17 is upwardly drawn and held between the mold surfaces 21 and 22 under heat and pressure to form a flex section 3 and a frustoconical lip portion 4, as illustrated in FIG. 9. Simultaneously with this, that portion of upper, thinner flap 8 which lies adjacent to the coiled spring 10 is bulged into an annular groove 23 formed in the mold surface 21 of the stationary mold section 18, allowing the coiled spring 10 to be embedded in the annular sheet 17 between the upper and lower flaps 8 and 9 thereof without any deformation. Specifically, it is to be noted that, in the course of the molding operation in which the annular sheet 17 set in the stationary mold, as shown in FIG. 8, is heat-molded to final shape, as shown in FIG. 9, the coiled spring 10 is freely movable in the slit 7 between the sheet flaps 8 and 9 to follow a path such as indicated in FIG. 8 at 1, thus keeping its radius unchanged. Owing to this, the coiled spring 10 is automatically positioned in the slit 7 so as to be embedded therein at a predetermined location adjacent to the closed end of the slit 7.

Figure 6:
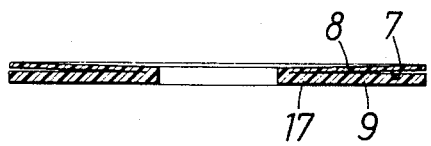

Though, in the process described above, the slit 7 is cut in the annular sheet 17 of fluorocarbon resin after the sheet has been trimmed, as stated above with reference to FIGS. 5 and 6, the annular sheet 17 may alternatively be prepared from a stock slit in advance, for example, by radially slitting a baked, elongate hollow cylindrical stock of fluorocarbon resin at regular intervals by appropriate knife or the like means and then severing the stock into annular sheets (17), each including a radial slit (7) therein.

At the end of the molding operation, the movable metal mold 20 is moved apart from the stationary metal mold 18,19 and the two mold sections 18 and 19 of the latter are separated from each other to release the molded article, which is an inner seal of the form shown in FIG. 1.

It will be readily understood that the outer seal shown in FIG. 4 can also be manufactured by the method of the present invention in subsequently the same manner as the inner seal of FIG. 1.

The seal material used in the present invention may be fluorocarbon resin in pure form or its mixture with an appropriate filler material. In cases where the seal is intended for use in chemical machinery and should have a substantial resistance to chemicals or where it is intended for use in food machinery and needs to be fully resistant to corrosion and fungi, use of fluorocarbon resin in pure form is preferred. On the other hand, where substantial wear and pressure resistances are required, a filler material such as glass fibers or carbon graphite should be added to the fluorocarbon resin.

As will be apparent from the foregoing description, according to the present invention, a radial seal is realized which is essentially made of fluorocarbon resin and is excellent not only in physical properties such as wear and heat resistances, usually required of a sealing device, but also in resistance to chemicals, corrosion and fungi due to the inherent characteristics of the seal material. In addition, the limited elasticity of the seal material itself, which usually results in an unsatisfactory sealing performance, is effectively compensated for by the arrangement of an annular elastic member in the sealing element at the closed end of a radial slit formed therein, such annular elastic member serving to materially enhance the ability of the sealing element to follow the mating surface of a rotating shaft or other member to be sealed and hence the overall efficiency of the seal formed of fluorocarbon resin.

Further, since the sealing element according to the present invention is radially slit from the peripheral edge of its flange portion to a vicinity of the peripheral edge of the lip portion of the sealing element to divide the most part of the latter into two overlapping sections, the flexibility of the seal lip portion is materially increased as compared with that of any unslit seal of similar configuration and this results in a further increase in the followability of the seal lip relative to the mating surface.

Also, the seal of the present invention is extremely simple in structure, consisting essentially of a slit sealing element and an annular elastic member such as an annular coiled spring embedded therein, and is quite inexpensive. The elastic member embedded in fluorocarbon resin is kept out of direct contact with any fluid being sealed and free from any corrosion and other deteriorating effects thereof, thus enabling the seal to maintain its satisfactory sealing performance for an extended period of use.

Further, according to the seal-making method of the present invention, since the annular elastic member such as an annular coiled spring is automatically positioned in the sealing element exactly at a predetermined location adjacent to the inner, closed end of the slit formed therein at the same time when the slit sealing element is molded into shape, there is no need of accurately positioning the annular elastic member in the slit prior to the molding operation and this results in an exceedingly high production efficiency, without involving any variations in shape and size of finished products.

While a few preferred embodiments of the present invention have been shown and described, it will be apparent to those skilled in the art that various changes and modifications may be made therein without departing from the spirit of the invention or from the scope of the appended claims.

What is claimed is:

1. A method of making a radial seal of fluorocarbon resin consisting essentially of:
   (a) slitting an annular sheet of fluorocarbon resin to form a radial slit extending from either the inner or outer peripheral edge thereof to the vicinity of the other peripheral edge in parallel to the opposite surfaces of said annular sheet;
   (b) inserting an annular elastic member into said slit in said annular sheet at a location adjacent to the closed end of said slit; and
   (c) shaping said annular sheet into an integral seal formation including a radially extending annular flange portion and a lip portion extending from said flange portion at an angle thereto through the intermediary of a flex section defined between said flange and lip portions, said lip portion having said annular elastic member automatically positioned therein.

2. A method of making a radial seal of fluorocarbon resin consisting essentially of:
   (a) slitting an annular stock of fluorocarbon resin to form a radial slit extending from either the inner or outer peripheral edge thereof to the vicinity of the other peripheral edge;

(b) cutting said stock into an annular sheet having said radial slit;

(c) inserting an annular elastic member into said slit in said annular sheet at a location adjacent the closed end of said slit; and (d) shaping said annular sheet into an integral seal formation including a radially extending annular flange portion and a lip portion extending from said flange portion at an angle thereto through the intermediary of a flex section defined between said flange and lip portions, said lip portion having said annular elastic member automatically positioned therein.

3. A method of making a radial seal of fluorocarbon resin as set forth in claim 1 or 2, wherein said shaping of said annular sheet into said integral seal formation is effected by the use of shaping mold means, said mold means comprising a divided stationary mold and a movable mold disposed opposite to said stationary mold for movement relative thereto, said stationary mold including a pair of first and second mold sections having opposed annular flat surfaces, said first mold section and said movable mold having annular tapered surfaces adapted for mating engagement with each other, one of said annular tapered surfaces being provided with an annular groove.

4. A method of making a radial seal of fluorocarbon resin as set forth in claim 3, comprising: placing said annular sheet in said divided stationary mold in a manner such that the outer half portion of said annular sheet is clamped between the opposed annular flat surfaces of said first and second mold sections with the remaining, inner half portion of said annular sheet held free in a mold cavity defined in said stationary mold centrally thereof; moving said movable mold toward said stationary mold to place the annular tapered surfaces of said first mold section and said movable mold in fitting engagement with each other while heating said molds so that the inner half portion of said annular sheet is drawn and held between said tapered mold surfaces under heat and pressure to form said flex section and said lip portion while at the same time said slit lip portion is bulged into said annular groove in one of said tapered surfaces, allowing said annular resilient member to be positioned in place in said lip portion.

* * * * *